(12) United States Patent
Thresher

(10) Patent No.: US 6,777,016 B2
(45) Date of Patent: Aug. 17, 2004

(54) FOOD PRODUCTS COMPRISING PEA OR LENTIL FLOURS AND THE PROCESS OF MAKING THE SAME

(75) Inventor: Wayne Carl Thresher, Ashhurst (NZ)

(73) Assignee: Canterbury Agriculture & Science Centre, Canterbury (NZ)

( * ) Notice: Subject to any disclaimer, the term of this patent is extended or adjusted under 35 U.S.C. 154(b) by 190 days.

(21) Appl. No.: 10/169,108

(22) PCT Filed: Jan. 17, 2001

(86) PCT No.: PCT/NZ01/00004

§ 371 (c)(1),
(2), (4) Date: Jul. 15, 2002

(87) PCT Pub. No.: WO01/52670

PCT Pub. Date: Jul. 26, 2001

(65) Prior Publication Data

US 2003/0031776 A1 Feb. 13, 2003

(30) Foreign Application Priority Data

Jan. 20, 2000 (NZ) ................................................. 502428
May 12, 2000 (NZ) ................................................. 504515

(51) Int. Cl.$^7$ ...................... A23L 1/0522; A23L 1/0528
(52) U.S. Cl. ........................................ 426/578; 426/579
(58) Field of Search ................................. 426/578, 579

(56) References Cited

U.S. PATENT DOCUMENTS

| | | | | |
|---|---|---|---|---|
| 3,872,229 A | * | 3/1975 | Durst et al. ................... 426/62 |
| 3,950,543 A | | 4/1976 | Buffa et al. ................... 426/18 |
| 4,022,919 A | | 5/1977 | Comer ........................ 426/511 |
| 4,544,563 A | | 10/1985 | Lechthaler .................. 426/276 |
| 4,554,563 A | * | 11/1985 | Nagano et al. ............. 347/143 |
| 4,675,199 A | | 6/1987 | Hsu ............................ 426/557 |
| 4,766,204 A | | 8/1988 | Nickel ......................... 530/378 |
| 4,824,683 A | | 4/1989 | Hodgson et al. .............. 426/62 |
| 4,828,852 A | | 5/1989 | Hsu et al. ...................... 426/94 |
| 5,034,227 A | | 7/1991 | Nickel ......................... 424/195 |
| 5,229,157 A | | 7/1993 | Birch et al. .................. 426/564 |
| 5,296,253 A | | 3/1994 | Lusas et al. ................. 426/629 |
| 5,324,532 A | * | 6/1994 | Stute et al. .................. 426/578 |
| H1620 H | | 12/1996 | Dolan et al. ................. 426/593 |
| 5,876,778 A | | 3/1999 | Stewart ....................... 426/508 |
| 6,602,534 B1 | * | 8/2003 | Rose et al. .................. 426/507 |

FOREIGN PATENT DOCUMENTS

| | | |
|---|---|---|
| CA | 1118270 | 2/1982 |
| EP | 371725 | 6/1990 |
| EP | 0371725 A2 | 6/1990 |
| EP | 478961 | 4/1991 |
| WO | WO93/22938 | 11/1993 |
| WO | WO94/15477 | 7/1994 |

OTHER PUBLICATIONS

Chen et al, Food Technology, Jan. 1992, pp. 88–92, A Non–Dairy Frozen Dessert Utilizing Pea Protein Isolate and Hydrogenated . . .

Fleming et al, Jour of Food Science, vol. 40, 1975, pp. 805–807 Gelation and Thickening Phenomena of Vegetable Protein Products.

(List continued on next page.)

*Primary Examiner*—N. Bhat
(74) *Attorney, Agent, or Firm*—Jacobson Holman PLLC

(57) ABSTRACT

The present invention relates to food products containing modified pea or lentil flour and to processes for preparing same. The applicant has determined that pea and lentil flours have good gelatinizing and coagulating properties not exhibited by other legume flours, concentrates and isolates. These properties make pea and lentil flours suitable for use in a wide variety of structured food applications.

52 Claims, 16 Drawing Sheets

OTHER PUBLICATIONS

Gebre–Egziabher et al, Jour of Food Science, vol. 48, 1983, pp. 375–377, Preparation of High Protein Curd from Field Peas.

Fernandez–Qunintela et al, Plant Food for Human Nutr.51, 1997, pp. 331–342, Composition and functional properties of . . .

Valle, G., et al., "Relationships Between Processing Conditions and Starch and Protein Modifications during Extrusion–Cooking of Pea Flour", *J. Sci Food Agric*. 1994, vol. 64, pp. 509–517.

Wang, N., et al., "Pasta–Like Product from Pea Flour by Twin–Screw Extrusion", *Journal of Food Science*, 1999, vol. 64:4, pp. 671–678.

Abstract, Jeffers, H.C., et al. "PEA: A Highly Functional Fortifier in Wheat Flour Blends", *The Bakers Digest*, Jun. 1978, pp. 36–40.

Abstract, Quillien, L., et al., Elisa to Evaluate the Transformation of PEA Flour During Extrusion–Cooking, pp. 417–420.

Abstract, Fu, L., et al., "Instant Mixed Bean Noodles", May, 1999.

Abstract, Jingtian, W., et al., "Low–sugar and Low–Fat Snack Noodles", Dec. 1997.

Abstract, Yanien, L, et al., "Texture Stabilized Fresh Pasta for Cooking Directly from the Extruder", Jan., 1999.

* cited by examiner

FOOD PRODUCTS COMPRISING PEA OR LENTIL FLOURS AND THE PROCESS OF MAKING THE SAME

This is a nationalization of PCT/NZ01/00004 filed Jan. 17, 2001 and published in English.

FIELD OF THE INVENTION

The invention relates to food products containing modified pea or lentil flour, and to processes for preparing them.

BACKGROUND OF THE INVENTION

Substitutes for dairy based products have been developed in the food industry over many years. Plant protein based products offer advantages in terms of cost, nutritional properties, and accessibility, particularly in poorer countries.

Products based on legumes have been investigated. Soy bean in particular has been used to develop alternatives to dairy and meat products. Examples of soy products include tofu, imitation cheeses, meat analogs and non-dairy desserts. Over the years soy protein products have risen in price until they are nearly as costly as dairy and other high value proteins. This in turn has lead to exploration of cheaper alternatives such as pea flour.

The focus with both soy and pea products has been on value added fractions such as protein and starch isolates. The production of separate protein, carbohydrate and fibre by-products from legumes including peas and beans is described for example in U.S. Pat. No. 4,766,204. EP 0371725 provides methods for producing aerated food products using vegetable starch, including pea starch and stabilizers. EP 0639056 similarly uses vegetable starches to thicken foodstuffs.

Vegetable protein slurries including pea protein concentrates and their properties are described in Fleming S. E., et al. Journal of Food Science (1975) 40: 805–807. It is suggested that field pea concentrates and isolates may be useful as an alternative to soy protein where gelling ability is required. In Fernadez-Quintela et al. Plant Foods for Human Nutrition (1997) 4: 331–342, pea, soyabean and fava bean composition and functionality was investigated. Weak functional properties were identified. This reflects the applicants own findings that pea tofu prepared from a pea protein isolate formed only a small curd which was runny and easily disintegrated.

Slightly better results with pea flour to produce tofu were achieved by Gebre-Egziabher A. et al., Journal of Food Science (1983) 48: 375–377 and 388. The yield of curd from pea flour was about one third of that from soybeans. Moreover, the curd was grey in colour and soft in texture. Both colour and texture could be improved by addition of gluten. Gelling and coagulating properties of pea flour products other than curd were not investigated.

U.S. Pat. No. 5,296,253 describes the production of low moisture shelf stable products from legumes which requires two essential cooking steps while minimising shear. The first of the cooking steps is required to maintain the water content in the substrate. There was no investigation or recognition of the properties of pea or lentil substrates or effects of shear thereon in U.S. Pat. No. 5,296,253.

Specific food applications for pea protein isolate have been suggested. For example as dairy analogs. Chan ASM et al. (1992) Food Technology; January: p88–92; as a coconut cream alternative, EP 00679059, and as part of a dry beverage mix in H1620.

However, there has been little, if any, investigation into the properties of pea flour in its own right. This oversight may well be attributable to the unpleasant taste of pea flour, the fact that it is a low value product, and that soy has been a ready alternative. Therefore, utilities for pea flour identified to date are largely limited to its use as a thickener. See, for example, EP 00371725.

The present applicants therefore sought to investigate whether flours, including pea flour itself, as opposed to protein and starch concentrates and isolates could be used as a dairy and/or soy alternative. Surprisingly, the applicants found that pea and lentil flours have good gelatinising and coagulating properties not exhibited by other legume flours such as chickpea and soyabean flours, concentrates and isolates. The gelling properties make the pea and lentil flours suitable for use in a wide variety of structured food applications.

It is therefore an object of the present invention to provide a product suitable for use as a structured food or food analogue, which will at least provide the public with a useful choice.

There is also an increasing demand for foods which are not genetically modified. For example, soy protein, which has been used to make foods as soya tofu, is costly, regarded as universally genetically modified and contains antinutrients that are a concern for some consumers.

This may represent a further advantage of the products of the present invention.

SUMMARY OF THE INVENTION

Accordingly, in a first aspect the present invention provides a gelled food product comprising a stable gel matrix capable of holding bulk liquid formed from a starch and protein containing pea or lentil flour, wherein the flour starch has been gelatinised and the flour protein has been at least partially denatured and coagulated, and an added coagulating agent, wherein the coagulating agent is a di- or multivalent cation or salt thereof added in an amount of from about 0.06% by weight of the product; and with the proviso that the product does not include a hydrolysing enzyme.

Preferably, the flour is yellow pea flour.

Preferably, the product further comprises a source of lipid, most usually a vegetable oil or butter.

Preferably, the coagulating agent is desirably a di- or multi-valent metal salt, more preferably a calcium or magnesium salt.

The product may be in the form of either a solid or a semisolid.

In the above embodiments, the product preferably includes one or more flavouring agents.

The product may further include one or more additional additives or bio-active agents, such as vitamins, minerals, omega-3 lipids, and "healthy" microorganisms such as Bifidus sp and Acidophilus sp.

In a further aspect, the present invention provides a process of preparing a gelled food product comprising a stable gel matrix capable of holding bulk water, the process comprising:

forming a mixture of a liquid, an added coagulating agent and a starch and protein containing pea or lentil flour, wherein the flour starch is gelatinised and the protein flour is at least partially denatured and coagulated, wherein the coagulating agent is a di- or multivalent cation or a salt thereof and is added in an amount of from about 0.06% by weight of the product; with the proviso that no hydrolysing enzyme is used in the process.

Preferably, the flour is yellow pea flour.

Preferably, the mixture also includes a source of lipid, most usually a vegetable oil or butter.

It is also preferred that the coagulating agent is a di-valent or multi-valent metal salt, more preferably a calcium or magnesium salt.

In one preferred embodiment, the process comprises the following steps:

(i) mixing pea or lentil flour and liquid under conditions of shear and temperature sufficient to hydrate the flour and initiate gelatinisation of the flour starch;
(ii) heating the mixture to a sufficient temperature and for a sufficient time to complete starch gelatinisation and to denature the flour protein;
(iii) adding the coagulating agent to coagulate the denatured proteins; and
(iv) allowing the mixture to coagulate.

In a further preferred embodiment, the process comprises the following steps:

(a) mixing pea or lentil flour and water under conditions of shear and temperature sufficient to hydrate the flour and initiate gelatinisation of the flour starch;
(b) combining a source of lipid with the mixture under conditions of shear and temperature sufficient to form an emulsion;
(c) heating the mixture to a sufficient temperature and for a sufficient time to complete starch gelatinisation and to denature the flour protein;
(d) adding the coagulating agent to the mixture to coagulate the denatured proteins; and
(e) allowing the mixture to set into a gel.

As the reader will appreciate, the order of the steps in the process can be varied while still obtaining desired end products.

Preferably, in the processes the coagulating agent is a calcium or magnesium salt.

Preferably, the flour is yellow pea flour, which has preferably been subjected to a debittering process before use.

Preferably, in each of steps (i), (a) and (b) immediately above, the mixture is heated to a temperature of about 55–65° C., more preferably about 60° C.

Preferably, in step (ii) and (c), the mixture is heated to a temperature of about 73–100° C., more preferably about 85–90° C.

In another preferred embodiment, there is provided a process for producing a gelled food product comprising a stable gel matrix capable of holding bulk water, the process comprising:

extruding a mixture of a starch and protein containing pea or lentil flour, an added coagulating agent, and liquid under conditions of temperature and shear sufficient to gelatinise the flour starch and at least partially denature and coagulate the flour proteins, wherein the coagulating agent is a di- or multivalent cation or a salt thereof, and is added in an amount of from about 0.06% by weight of the product; with the proviso that no hydrolysing enzyme is used in the process.

Preferably, the flour is yellow pea flour.

Preferably, the mixture further includes a source of lipid. As above, a preferred protein coagulating agent is a calcium or magnesium salt.

In one embodiment, prior to the extrusion step (a), flour, water and protein coagulating agent are mixed together before the source of lipid is added.

Preferably, the extrusion is carried out at a temperature of about 73–180° C.

In a further aspect, the present invention provides a food product obtained by, or obtainable by a process as defined above.

Also described is a gelling agent consisting essentially of a starch and protein containing pea or lentil flour, and an added coagulating agent, the native structure of the flour being modified sufficiently when a suitable liquid is added to produce a stable gel matrix, wherein the coagulating agent is a di- or multivalent cation or salt thereof, and is added in an amount of from about 0.06% by weight of a product to be formed, and wherein the flour modification comprises flour starch gelatinisation and flour protein denaturation and coagulation.

Preferably, the gel, sol or gelling agent further comprises a source of lipid.

While the invention is broadly as defined above, it is not limited thereto and also includes embodiments of which the following description provides examples.

BRIEF DESCRIPTION OF THE DRAWINGS

The invention will now be described in more detail and with reference to the accompanying drawings, in which.

DETAILED DESCRIPTION OF THE INVENTION

Figure 1:
FIG. 1 is a photograph of a pea flour-cheese analogue of the invention.

As defined above, the present invention relates to food products prepared from pea or lentil flour and to processes for preparing such products.

The products of the invention are solids or semi-solid and have properties which render them highly suitable for use in a wide variety of structured food applications. The products are formed by gelatinising and coagulating the starch and protein respectively in pea or lentil flour. That this is possible for pea and lentil flour is surprising as this is not a property of many other familiar legume flours, including chickpea flour and the commonly employed soya bean flours, concentrates and isolates, These latter flours, concentrates and isolates in particular were not found to give products suitable for such applications.

Thus, in general terms the invention relates to food products comprising pea or lentil flour, in which the starch component of the flour has been gelatinised and the protein component of the flour has been denatured and coagulated. What is formed is a matrix that is a stable emulsion and holds bulk water. A water activity near or equal to 1 is common, At this water content the water may be physically entrapped and its macroscopic flow impeded, while still exhibiting the physical enthalpy, solvent characteristics and ability to support chemical reactions and microbial growth of pure water. Lower water activities are also feasible.

As the reader will appreciate, gelatinisation, denaturation and coagulation occurs along a continuum from the partial state, which is still sufficient to alter the properties of the flour product to the complete state. The degree of gelatinisation, denaturation and coagulation can be selected according to the desired conformation of the final product however, levels of gelatinisation, denaturation and coagulation will give more liquid or flowable products, whereas higher levels result in semisolid or solid products. It is well within the capacity of the skilled artisan to adjust levels to suit the required end product.

In one embodiment, the starch is completely gelatinised and the protein completely denatured and coagulated.

Desirably, the denaturation and coagulation results in a gellable product. In most cases the product when first made will be a pourable or formable liquid or semisolid. Most usually, the final form of the cooled and set product is a gel or sol. The term "gel" as used herein takes its common encyclopedia definition of:

A coherent mass consisting of a liquid in which particles too small to be seen in an ordinary optical microscope are either dispersed or arranged in a fine network throughout the mass. A gel may be notably elastic and jellylike (as gelatin or fruit jelly), or quite solid and rigid (as silica gel, a material that looks like coarse white sand and is used as a dehumidifier). Gels are colloids (aggregates of fine particles, as described above, dispersed in a continuous medium) in which the liquid medium has become viscous enough to behave more or less as a solid.

A gel is an example of a semi-solid product of the invention. Semi-solid products may be used for example as dairy food analogues, such as a pate, sauce, spreadable cream cheese, yoghurt, sour cream or ice cream analogue, or a dessert such as a mousse or a custard analogue.

When the product is solid, it may be used, for example, as an edible gum, a cheese or processed cheese analogue or as an imitation sausage.

The terms "solid" and semi-solid" are used broadly herein to distinguish from liquids or sols which are pourable and assume the shape of a mould.

The term "sol" as used herein also takes its common encyclopaedia definition of:

A colloid (aggregate of very fine particles dispersed in a continuous medium) in which the particles are solid and the dispersion medium is fluid. If the dispersion medium is water, the colloid may be called a hydrosol. Lyophobic (Greek: "liquid-hating") sols are characterized by particles that are not strongly attracted to molecules of the dispersion medium and that are relatively easily coagulated and precipitated. Lyophilic ("liquid-loving") sols are more stable and more closely resemble true solutions. Many sots are intermediate between lyophobic and lyophilic types.

The flour used in the products of the invention is preferably yellow pea (also known as white pea or field pea) flour. Marrowfat pea or lentil flour may also be used as may mixtures of any of these flours. Pea and lentil flours have a further advantage in that they are not currently genetically engineered (GE) unlike soybean. These non-GE flours may therefore find ready consumer acceptance. However, the use of GE pea and lentil flours is not excluded.

The flours useful in this invention may include small amounts of native coagulating agents including calcium and magnesium ions. For some purposes, such as the production of sols, this is a sufficient level of coagulating agent to effect a desired degree of protein coagulation. However, for most applications and particularly production of gels, a protein coagulating agent needs to be added to the flour. Accordingly, in a further embodiment the products of the invention further comprise a coagulating agent to enhance the gelling effects. Suitable gelling agents include di- and multivalent cations or salts thereof such as metal salts. Useful metal salts include di-valent and multivalent salts, especially calcium and magnesium salts such as calcium sulfate, calcium, chloride, magnesium sulfate, or magnesium chloride and even di- and trivalent salts of iron such as iron sulfate, and iron chloride. Other multi-valent metal salts may also be used. The amount added will usually be in the range of 0 to 3% depending on the end product desired. For a gelled food product having a stable gel matrix capable of holding bulk liquid the coagulating agent is added in an amount of from about 0.06% by weight of the product, preferably from 0.06 to 3% by weight of the product.

The coagulating agent is preferably added at a level of up to about 1%, more preferably from about 0.06 to 1.00% by weight of the product. The precise amount added will depend on the desired gel hardness and textural properties required in the product: a 2 to 3% (w/w) addition of calcium or magnesium salt has been found to yield maximum effect on gel parameters such as fracture and hardness (FIG. 4), as measured with an Instron Universal Testing Machine (Model 4301). Without being bound by the theory, it is proposed that the coagulating agent enhances and stabilises protein cross-linking, facilitating formation of the gel matrix.

The lipids when employed in the products of the invention may be selected from fats, fat substitutes, vegetable oils or mixtures thereof. Suitable fats include dairy fats such as cream and butter. Preferred vegetable oils include canola oil, soya oil, olive oil and peanut oil, amongst others. Synthetic fats or oils and fat replacers such as polyglycerols, Simplese™ and inulin may be used. The list provided is exemplary only and lipid sources are not limited thereto. The lipids and substitutes form emulsion droplets which contribute to hardness, fracture and general viscoelastic properties of gels as well as playing an important role in mouth feel.

The food products according to the invention have properties which range from custard-like through to firm and cheese-like, or textured to impart a meaty consistency depending on the proportions of the components of the product, including levels of lipid and protein coagulating agent, and the process conditions used to produce the product, including levels of heat and hydration.

Depending on the desired application of the product, the product will preferably also include one or more additives. A wide range of additives may be selected from binding agents, sweeteners (including sugars), flavouring agents and essences, salts, emulsifiers, stabilisers, antioxidants, vitamins, minerals, proteins, colourings, enzymes, flour agents, wetting agents, thickeners, preservatives, acidifiers, herbs, spices, hormones, oligosaccharides, lipids, and microorganisms amongst others. Such additives are known in the art. A useful reference is the Codex General Standard for Food Additives 192-1995 (Rev.2-1999) Published by Codex Alimentarius Commission FPO/WHO as part of Volume 1A General Requirements.

Where a sweet product such as a dessert is desired, sweeteners can be added. While sugars (for example, glucose, fructose, maltose, dextose, lactose, sucrose and mixtures thereof) are most commonly used, artificial sweeteners such as saccharin, aspartame, and the like may also be used.

Flavouring agents include a broad range of agents known in the art such as caramel and chocolate powders and malt extracts dairy/cheese flavours, masking flavours, fruit flavours, meat and broth and hydrolysed vegetable flavours.

Thickening agents may be added to enhance texture characteristics, minimize syneresis and to prevent sedimentation. Conventional food grade thickening agents may be used. These include β-glucans, carrageenan, xanthan and other gums, pectin, guar locust bean and kon-jac.

Animal protein may be beef, pork, lamb, chicken, turkey, dairy and fish-based, amongst others.

Vegetable protein includes soy, corn/maize and gluten but are not limited thereto.

Dairy materials such as cheese, milk, cream cheese, and artificial substitutes or proteins such as casein and caseinates, beta-lactoglobulin and alpha-lactalbumin or combinations of whey proteins may be utilised in products of the invention.

Vitamins and minerals may be added as supplements or to meet recommended daily allowances. Examples of vitamins and minerals that may be added are vitamins A, including all commonly used retinoids and retinol esters, the B vitamins, C, D, folate, various forms of vitamin E and other water or fat soluble vitamins. Examples of minerals that may be added are calcium, magnesium, zinc, iron salts as well as various mineral preparations such as natural sea salt.

Neutraceutical products can be designed to provide essential requirements to persons in need thereof. For example, vitamins to those with vitamin deficiencies, iron for anaemia, calcium for bone growth and density, omega-3 for healthy vascular tissue and prevention of coronary heart disease and improved mental health, microorganisms such as Bifidus sp and Acidophilus sp for gut or oral health, as well as yoghurt starter cultures, and hormones such as phytoestrogens which primarily function as antioxidants and/or estrogen mimics with attendant health benefits associated with lower estrogen levels. Accordingly, the products of the invention also have medical and pharmaceutical applications.

The food products of the invention may in general terms be prepared by forming a mixture of pea or lentil flour, liquid, and a protein coagulating agent, in which the flour starch is gelatinized and the flour protein is at least partially denatured and coagulated to an extent such that on cooling, the product will set.

The liquid employed may be any liquid suitable for use in food products including milk, juice and water. Water is preferred. Accordingly, while water is referred to hereafter for convenience the use of alternative liquids is not excluded.

Desirably, a source of lipid is also included in the mixture.

The gelled products of the invention may conveniently be made using either an extrusion process or a batch process involving blending and heating stages. These processes will now be described in more detail.

Unless an extrusion process which significantly decreases bitterness is used, it is preferred that the pea flour is first subjected to a process which debitters the flour, for example using a process as described in U.S. Pat. No. 4,022,919. Alternative debittering processes known in the art may also be used.

A suitable debittering process involves subjecting the flour to low-pressure steam, for a period of time suitable to obtain a bland tasting flour. Generally, a period of not more than about 20 minutes is sufficient for debittering to take place, preferably debittering is effected by steaming for 10 to 14 minutes. Excess steaming, in particular for longer than about 30 minutes, should be avoided to prevent the formation of "cooked pea" flavours.

Once the pea flour has been debittered, it is then cooled and preferably ground to pass through a 30 mesh sieve or smaller. The pea flour is then ready for use.

Batch Process

It is preferred that the pea flour is first mixed with water, in order to hydrate the flour and initiate gelatinisation of the starch. It will be appreciated that the relative quantities of flour and water used will depend on the desired consistency and intended use of the food product (i.e. whether a creamier, semi-solid product or a more solid product (for use for example as a cheese or sausage analogue) is desired. Selection of appropriate ratios can be achieved by the normally skilled worker without the exercise of any inventive faculty. However, the flour is preferably mixed with water at a ratio in the range of 1:20 to 1:2 w/w flour:water. For example, a yoghurt analog may be 1:13.3 and a firm sliceable cheese could be 1:4 w/w flour:water and in the case of a spreadable snack the ratio may be 1:8 w/w flour:water.

The temperature of the water at this stage should be warm enough to initiate gelatinisation of the starch, preferably about 55–65° C., more preferably about 60° C. In some applications chilled water may be preferable. For example, for large scale applications it may be useful to disperse the flour in chilled water to achieve uniform and timely mixing.

It is preferred that the water is added to the flour at a sufficient rate to prevent clumping, for example at about 0.1 liter per second per kg of flour. Alternatively, the flour may be added to water with moderate mixing. The mixing rate of the flour and water should not be excessive, in order to prevent foaming. Mixing rates may vary with manufacturing conditions, scale and available equipment. A mixing speed of between about 200 and 500 rpm is generally preferred. The mixing should be continued for a sufficient time to ensure complete dispersion of the flour particles, for example, about 1 to 5 minutes, most usually 4 minutes.

Once the flour has been hydrated and starch gelatinisation initiated, a source of lipid may be added if being used. The lipid may conveniently be either a vegetable oil (such as canola oil) or a source of dairy fat such as butter, or a mixture of oils, dairy or animal fats. The lipid should be mixed in for a time preferably for less than 30 minutes, and usually for 1 to 4 minutes, and under conditions of shear and temperature sufficient to allow the mixture to form an emulsion. For example, moderate shear, such as that produced by a typical blender, bowl chopper or food processor, which maintains the temperature in the range of from about 55° C. to about 65° C., more preferably at about 60° C., may be used. Under these conditions, a stable emulsion is observed to form coincidentally with a colour change from pale yellow to creamy white.

The proportion of lipid added will depend on the desired texture and end use of the food product. The lipid will generally be present in the range of 0 to 40% by weight of the final product. However, usually the ratio lipid: flour is in the range of 1:5 to 1–40 w/w lipid:flour. Preferred ratios of lipid to flour are 1:1 to 1:10 v/w, and more preferably 1:1 to 1:5 v/w. For example, a nutrient dense food for athletes/sports people could contain 1:5 and a low-fat diet could contain 1:40 w/w lipid-flour The ratios for a cheese analogue may be 1:1.25 v/w lipid:flour, 1:2.6 v/w lipid:flour and 1:1.6 v/w lipid-flour for a spreadable snack.

If desired, additives discussed above including flavouring agents, salt (ie sodium chloride) and/or modifiers such as waxy maize, $\beta$-glucan (or other gums) and caseinates such as sodium caseinate may be added either during or before the emulsification step.

The emulsion is then subjected to a heating (cooking) step. The emulsion is heated to a sufficient temperature to gelatinise the flour starch and also to at least partially denature the protein component of the flour. To accomplish this, it is preferred that the mixture be heated to a temperature of at least about 73° C., commonly 73° C.–100° C. and held there for a sufficient time to achieve the desired extent of gelatinisation and denaturation but not so long as to allow a "cooked pea" flavour to develop, and to lose gelling characteristics. Generally, the overall cooking time should not exceed about 30 minutes. It is generally preferred that the temperature is increased at a rate of about 1.5° C. per minute or greater until a temperature of about 73–100° C. is achieved, and the temperature held at this level for a period of about 3 to about 4 minutes and, preferably, under 30 minutes A viscosity transition occurs at about 73–77° C. as the starches gelatinise and interact with the emulsion droplets.

Following the heating stage, the denatured flour proteins are coagulated by adding a suitable coagulating agent as discussed above to an extent such that the resulting product forms a gel.

Following addition of the coagulating salt, the emulsion is preferably immediately allowed to set. If desired, volatile flavourants and/or heat sensitive ingredients may also be added at this stage. For example, butter, and/or cheese flavours in cheese analogs.

Figure 15:
FIG. 15 is a light micrograph of the yoghurt-analogue of example 2, before addition of calcium salt. Magnification ~470×.
Figure 16:
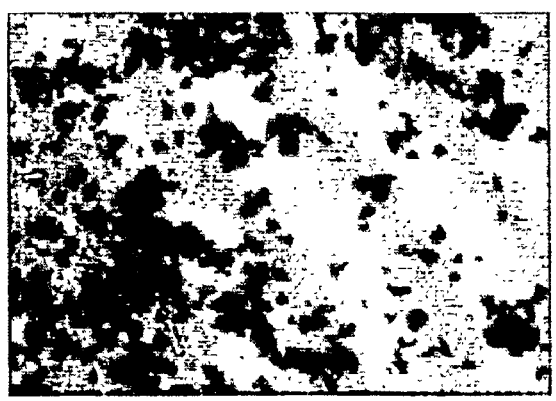
FIG. 16 is a light micrograph of the yoghurt-analogue of example 2, after addition of calcium salt. Magnification ~470.

Products may also be aerated at this stage using known art techniques if desired. Preferably, aeration is effected prior to addition of the coagulating salt. For example, air may be entrapped within the gel matrix by rapidly introducing air by various means such as whipping or injecting and then mixing in calcium salt(s) prior to setting. This has the effect of physically stabilising and entrapping air bubbles. The food matrix that forms is partly stabilised by specific interactions between the emulsion droplets (both air/water and oil/water emulsions) and multivalent metal ions as illustrated in FIGS. 15 and 16. FIG. 15 is a light micrograph of an emulsion formed according to the procedure given in example 2 prior to addition of calcium salt. Note that the droplets are freely dispersed throughout the image. After calcium addition (FIG. 16) the emulsion droplets have drawn together, but do not coalesce. Hence, the specific interaction helps to form an ordered and structured food matrix.

Prior to setting, the emulsion may if desired be poured into moulds, pottles or other suitable containers. As gelling will begin immediately after the addition of the coagulating agent, the liquid cooked emulsion should be transferred into the final containers as quickly as possible. It is generally preferred that the emulsion be allowed to cool at ambient temperature for about 20 to 30 minutes and then refrigerated for storage. Rapid chilling of products such as dairy food analogues and desserts is also contemplated.

Figure 5:
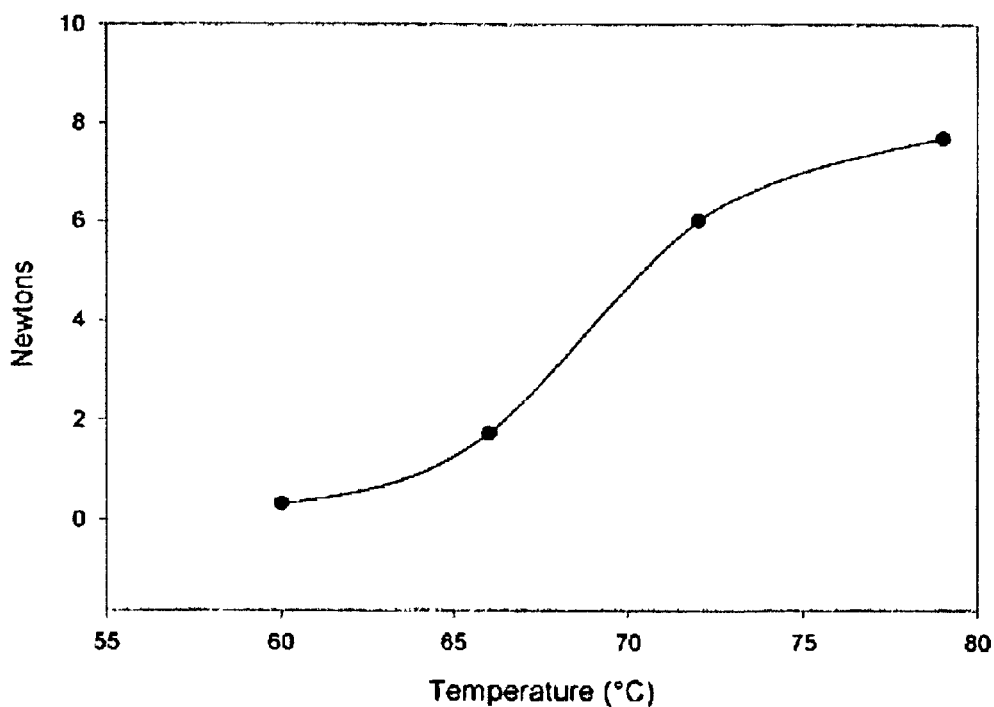
FIG. 5 is a graph showing the effect of maximum temperature on hardness.
Figure 6:
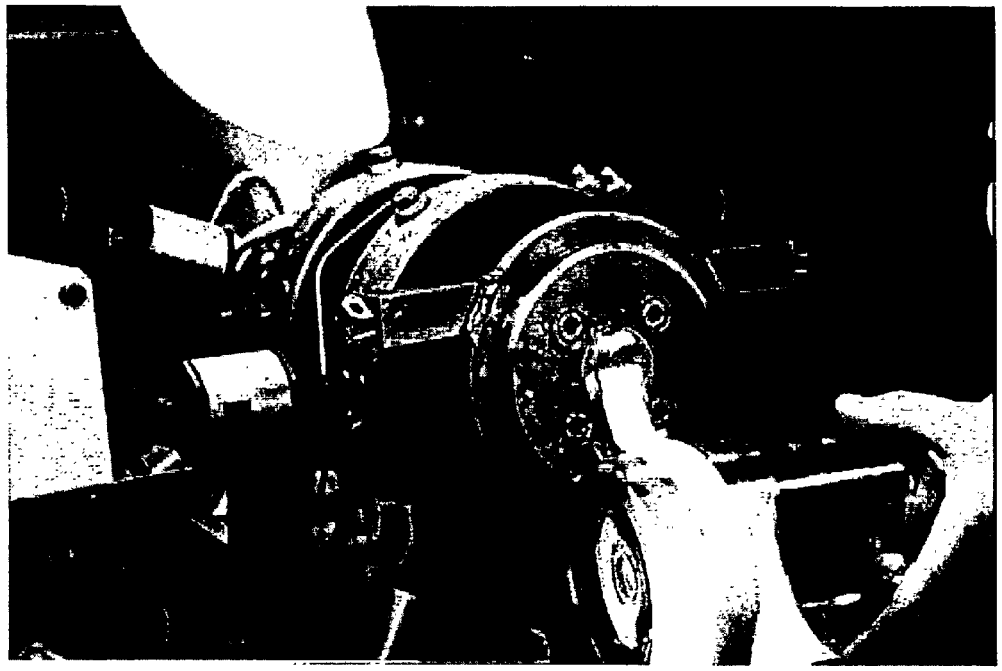
FIGS. 6 and 7 show an extruded product of the invention.
Figure 7:
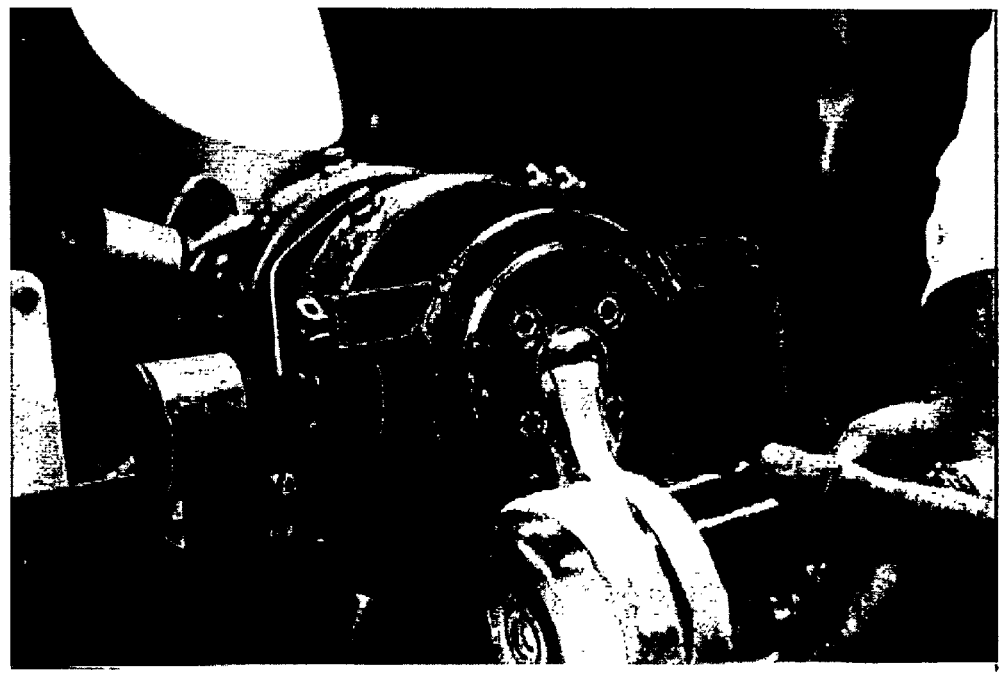

The batch process described above is particularly suitable for making soft and/or spreadable products suitable for use as non-dairy desserts, thickeners, sauces and quiches etc. The hardness of the product may be controlled by various process treatments. For example, the temperature may be varied to change the hardness of the product. FIG. 5 and Example 1 shows the relationship between maximum applied temperature and the hardness of the final product.

Extrusion

Food products of the present invention may also be prepared using extrusion. If strong and firm gels are desired, in order to produce products such as imitation processed cheese or imitation sausage or kamaboko (a type of Japanese fish sausage), extrusion is generally the preferred preparative method. Extrusion has the advantage that a bitterness removal step may not be required—the applicants have found that the bitterness of pea flour can be virtually eliminated under the right extrusion conditions.

The food products of the invention may be prepared by an extrusion process in which a mixture of the pea (or lentil) flour, water, an optional source of lipid (such as vegetable oil or butter) and a coagulating agent (preferably a calcium or magnesium salt) is extruded under conditions of shear and at temperature sufficient to gelatinise the flour starch and at least partially denature and coagulate the flour proteins to an extent such that the resulting product will set. Preferably, the extrusion conditions are sufficient to substantially fully effect gelatinisation, denaturation and coagulation such that the resulting product will set, desirably into a gel.

Although not essential, it is preferable that initially the flour, water and coagulating agent when added are first thoroughly mixed together before the source of lipid is added. The mixture is then extruded using an extruder such as Clextral BC 21 having a screw configuration which will provide sufficient shear and mixing to produce a stable extruded product.

It is generally preferred that the extrusion be carried out at a temperature of about 85° C. to about 180° C., preferably 80–100° C. and usually at greater than 100° C. where an expanded product is required. For example, if an expanded product is desired, the exit temperature should be greater than 100 C., preferably 110° C. to 180° C. If the product is not expanded the temperature should be less than 100° C. depending on the specific product desired. For example, a processed cheese analog could preferably be heated to an exit temperature of 95° C., while a spreadable cream-cheese analog would preferably exit in the range 75° C. to 85° C. For example, an extrusion temperature of about 90° C. and a flow rate of about 400 g/min though a slit die have been found to produce satisfactory products.

The extruded mixture may be poured into cups or moulds of a desired size/shape prior to cooling and setting, or cooled on a rotating drum and cut into slices.

The relative proportions of the ingredients will again depend on the desired textural properties of the finished product. However, in general, when an extruded product having a texture suitable for use as an imitation processed cheese or sausage is desired, the proportions will desirably be in the following ranges, in percent by weight of the total composition:

Flour: 5–25% by weight, water: 60–90% by weight, lipid: 0 to 15% by weight, coagulating salts: up to 1.0% by weight, preferably flour: 15–25% by weight, water: 70–80% by weight, lipid: 3.5 to 15% by weight, coagulating salts: up to 1.0% by weight.

The extruded product may also include one or more additives as discussed above, including salt (i.e. sodium chloride) to enhance the flavour. In addition, sugars, gums, and other complex carbohydrates and proteins (such as maize, $\beta$-glucan or a caseinate) may be added if desired, to enhance the sensory/textural qualities of the product.

It will be appreciated that the food products of the invention have a wide variety of potential applications, as outlined above. In particular, softer products may be used as spreadable cream cheese analogues, yoghurt, sour cream or ice cream analogues, or as non-dairy desserts such as mousse or custard analogues. They may also be used as thickeners in sauces or in quiches. Firmer gelled products of the invention are suitable for example for use as imitation sausage and imitation processed cheese.

The food products of the invention are also particularly suitable for use as vehicles for other functionalities, such as carriers for vitamins, minerals and other nutrients, such as omega-3 lipids, GAG (glycosaminoglycans), $\beta$-glucan, calcium, folate and "healthy" microorganisms such as Bifidus sp and Acidophilus sp.

The products of the invention can, in a further embodiment, be presented in dried form. Suitable dying techniques known in the art may be employed. For example, spray drying, freeze drying or drum drying to form premix products. The product can then be diluted with liquids. Such premix products include sauces, soups, desserts, drinks. The dried products may be bulk packaged or packaged as single serve products.

Typically, an instant, reconstitutable dessert would contain, per 2 serving sachette, 25 g flour, 15 g lipid, 5 g flavour and 0.3 g $CaCl_2$ This may then be reconstituted with 200 ml of water and consumed.

Food products of the invention may also be provided in the form of an extruded intermediate product designed to be further processed by, for example, microwaving or cooking in an oven.

As the reader will appreciate, the products of the invention may also be combined with other food products. For example, a yoghurt or dessert of the invention could be combined with a known dairy based yoghurt or dessert. Accordingly combinations of pea and lentil flour based products with one or more soy, bean, and dairy based products amongst others are specifically contemplated herein. Hybrid products may also be produced using the processes of this invention and known manufacturing techniques.

Also described herein are gels, sols and gelling agents comprising a starch sourced from pea or lentil, and protein sourced from pea or lentil wherein the starch is gelatinised and the protein is denatured and coagulated as discussed above. Described are partially and fully gelatinsed, denatured and coagulated products. The starch and proteins may be from different sources or the same source. Most usually they will both be from the same source, conveniently a flour.

Also described are gelling agents containing pea or lentil flour, the native structure of the flour being modified sufficiently to produce a gel when a suitable liquid is added.

The invention also provides gelling agents consisting essentially of a starch and protein containing pea or lentil flour and an added di-valent or multivalent cation or salt thereof. The flour is modified by gelatinisation and coagulation on the addition of a liquid to produce a stable gel matrix, The gels, sols and gelling agents discussed above desirably also include a source of lipid as discussed above.

Without wishing to be bound by any theory, it is believed that the stable gel structure formed from pea or lentil flour in making the food products of the invention derives from at least three distinct mechanisms:

1. starch gelatinisation and subsequent gelation,
2. protein-to-protein interactions, as in disulfide, hydrophobic and hydrogen bonding, and
3. protein, multivalent salt, particularly calcium, cross-linking.

The emulsion or matrix formed is a three dimensional network of polysaccharide and protein chains stabilised to varying extents by the addition of coagulating agents and lipids.

The invention will now be illustrated with reference to the following non-limiting examples.

EXAMPLES

Example 1
Pea Flour-Cheese Analogue (FIG. 1)

200 ml water was mixed with 50 g yellow pea flour. The mixture was heated to 60° C. in a water bath with continuous mixing. The heated mixture was then poured into a blender containing 40 ml canola oil and whizzed on high for 4 minutes. A teaspoon of Parmesan cheese and 500 mg salt were added for flavour. The liquid was further blended for 30 s on high. The mixture was then returned to the water bath and heated to 85° C. Calcium sulfate (1.5 g) was added and mixed uniformly throughout the liquid. It was then immediately poured into cylindrical moulds, allowed to stand at room temperature for 30 minutes and then placed in a refrigerator overnight.

Figure 2:
FIG. 2 is a photograph of a pea flour-yoghurt analogue of the invention.

Example 2
Pea Flour-Yoghurt Analogue (FIG. 2)

200 ml water was mixed with 15 g yellow pea flour. The mixture was heated to 60° C. in a water bath with continuous mixing. The heated mixture was then poured into a blender containing 40 ml canola oil and whizzed on high for 6 minutes. The mixture was then returned to the water bath and heated to 90° C. Calcium sulfate (1.0 g) was added and mixed uniformly throughout the liquid. It was then immediately poured into a cup, allowed to stand at room temperature for 15 minutes and then placed in a refrigerator for one hour. The creamy gel was mixed lightly with a fork and combined with raspberry fruit and sugar to taste.

Figure 3:
FIG. 3 is a photograph of a pea flour snack spread of the invention.

Example 3
Pea Flour-Snack Spread (FIG. 3)

200 ml water was mixed with 25 g yellow pea flour. The mixture was heated to 60° C. in a water bath with continuous mixing. The heated mixture was then poured into a blender containing 40 ml canola oil and whizzed on high for 3 minutes. The mixture was then returned to the water bath and heated to 85° C. Calcium sulfate (3.0 g) was added and mixed uniformly throughout the liquid. It was then immediately poured into a cup, allowed to stand at room temperature for 15 minutes and then placed in a refrigerator overnight. The creamy gel was sliced and spread on water crackers as a snack.

Figure 14:
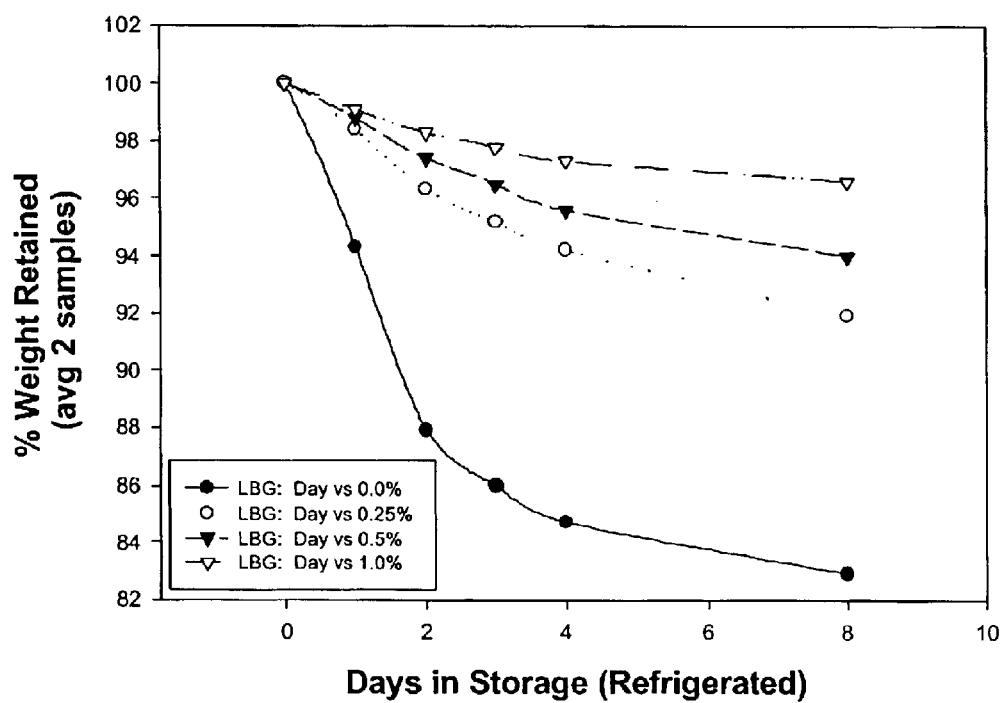
FIG. 14 is a graph showing Pea flour-based gel integrity during storage (LBG additon)

The effect of the addition of the calcium sulfate on the emulsion is illustrated by FIGS. 14 and 15. Before addition (FIG. 14) the emulsion droplets are uniformly and randomly dispersed throughout the bulk, aqueous phase. After addition of calcium salt the emulsion droplets aggregate and segregate into a discontinuous phase without disruption of the stable emulsion.

Example 4

Figure 8:
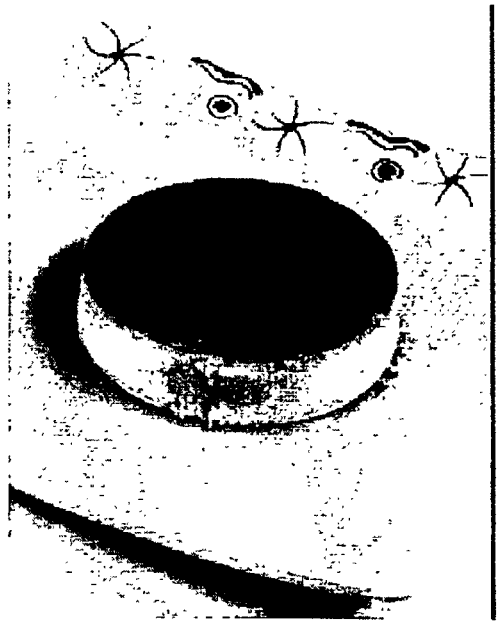
FIG. 8 is a photograph of a dessert of the invention.
Figure 9:
FIG. 9 is a photograph of a meat pattie of the invention.

Production of Pea Based Gels Using a Twin Screw Extruder (Extruded Product Shown in FIGS. 8 and 9)

TABLE 1

| Materials: Proportions of ingredients used. | | | | |
|---|---|---|---|---|
| Pea flour % | Water % | Oil % | Salt % | CaSO4 % |
| 9.93 | 76.88 | 13.00 | 0.05 | 0.08 |
| 7.77 | 81.99 | 10.16 | 0.04 | 0.06 |

TABLE 2

Screw configuration used on the Clextral BC21 twin screw extruder:
Screw element, number from input port

| Element | 1 | 2 | 3 | 4 | 5 | 6 | 7 | 8 | 9 | 10 |
|---|---|---|---|---|---|---|---|---|---|---|
| Type | S | S | S | M | M | S | M | S | S | S |
| Number | 1 | 1 | 1 | 4 | 4 | 1 | 4 | 1 | 1 | 1 |
| Pitch | 13 | 13 | 10 | 2 | 10 | 7.5 | 3 | 7.5 | 7.5 | 7.5 |
| Direction | F | F | F | R | R | F | R | F | F | F |
| Length | 50 | 50 | 50 | 50 | 50 | 50 | 25 | 50 | 50 | 50 |
| Zone | 1 | 1 | 1 | 2 | 2 | 2 | 3 | 3 | 3 | 3 |
| Temp | 90 | 90 | 90 | 90 | 90 | 90 | 90 | 90 | 90 | 90 |

S = Screw element
M = Mixing element
F = Forward,
B = Back,
R = Splines to right,
L = Splines to left Predicted and measured dry matter proportions (including oil in the dry matter) were 61% and 66% respectively.

Design Characteristics

A Clextral BC21 (Clextral, Firminy, France) twin screw extruder was used. The screw configuration listed in table 2 was designed to provide sufficient shear and mixing to produce a stable extruded product. However, it is anticipated that a wide variety of screw configurations will be applied to make adjustments to the sensory and textural properties of the gel. The product was collected into small cups or onto a rotating cold surface as it exited the extruder die, where it cooled and set. The continuous sheet collected was then cut into squares to simulate small samples of processed cheese.

Ingredients

Water, pea flour, vegetable oil, calcium salt and salt. Note: Although no flavours were added to this embodiment, it is expected that suitable cheese flavours would be introduced to commercial versions of this concept product. Sugars, gums and other complex carbohydrates and proteins may be added to improve sensory/textural qualities.

Colour, Flavour and Texture

The colour was creamy white to pale yellow. The taste was very bland with no trace of residual bitterness. The product had a smooth and creamy mouthfeel.

Preparation

Ideally oil is added to the process after thoroughly mixing the flour, water and calcium sulphate. However, in the extruded product described here the water and oil were injected together due to physical limitations of the available machinery.

Water, oil, calcium salt and flour were extruded at 90° C. at a flow rate of approximately 400 g/min through a slit die. The hot mixture was either poured into portion cups and chilled or the hot ribbon from the die was cooled on a cold rotating drum and cut into short lengths to produce "mini slices".

Use

Imitation slice-on-slice processed cheese, other dairy food analogues.

Example 5

Creme Caramel
  Ingredients
    60 g—Pea flour
    160 g—caster sugar
    350 ml—water
    15 g—butter
    20 g—vegetable oil
    2.1 ml—Comax natural milk flavour
    1.4 ml—Maverik caramel creme flavour
    160 µL—pure vanilla essence
    3 g—CaSO$_4$
Method Dissolve 100 grams of castor sugar in 150 ml water and boil till caramalised. Pour the caramalised sugar syrup into a greased Pyrex dish and spread evenly to form a thin layer at the bottom of the dish. Mix the 60 grams of Pea flour with 200 ml of warm water (60° C.) and add the sugar, butter, and oil. Pour the mixer into a commercial blender (Waring brand) and blend at high speed for two minutes. Add flavour and continue blending for two more minutes. Stir in the 3 grams of CaSO$_4$ and pour the mixture into the Pyrex dish. Cover the dish with aluminum foil and place it into an oven tray half filled with cold water. Place the oven tray into a preheated oven (170° C.) for 40 minutes. Cool the product over night before removing the product from the Pyrex dish. A creme caramel of the invention is depicted in FIG. 8.

Example 6

Meat Pattie
  Ingredients
    50 g—Pea flour
    200 ml—water
    35 g—vegetable oil
    1 pkt—Maggi noodles beef flavour sachet
    2 ml—Comax natural milk flavour
    1 teaspoon—parsley
    1 teaspoon—bacon bites
    1 teaspoon—pepper
    ½ teaspoon—garlic powder
    1—egg
    bread crumbs.
Method Mix 50 grams of Pea flour with 200 ml of warm (60° C.) water. Add oil and pour the mixer into a commercial blender (Waring brand) and blend at high speed for two minutes. Add milk flavour, pepper, garlic and beef flavour and continue blending for two more minutes. Add bacon bites and parsley to the mixture and blend for 10 seconds. Cook the mixture in a microwave oven (stir mixture frequently) until it reaches 85° C. internal temperature. Pour mixture into four ramekins (approximate thickness of product 2 cm). Let to set in the refrigerator over night. Remove the set gel from the ramekins and blot surface to remove surface water. Coat the gel with whipped egg and breadcrumbs (double coat if preferred) and deep fry till golden brown colour. A meat pattie of the invention is depicted in FIG. 9.

Example 7

Figure 10:
FIG. 10 is a photograph of a pate of the invention.

Salmon Pate
  Ingredients
    50 g—Pea flour
    200 ml—water
    20 g—Butter
    15 g—vegetable oil
    1.5 g—salt
    50 g—smoked salmon
    600 µL—Comax cream cheese flavour
    600 µl—bacon flavour
    1 teaspoon—basil
Method Mix 50 grams of Pea flour with 200 ml of warm (60° C.) water. Add oil, butter salt and salmon and pour the mixer into a commercial blender (Waring brand) and blend at high speed for three minutes. Add cream cheese flavour, bacon flavour, and basil and blend for one more minute. Cook the mixture in a microwave oven (stir mixture frequently) until it reaches 80° C. internal temperature. Let to set in the refrigerator over night. Using a spoon mix well before serving. Use antipasto for garnishing. The addition of a coagulating agent is avoided as the texture of the product is better in its absence. A salmon pate of the invention is depicted in FIG. 10.

Example 8

Figure 11:
FIG. 11 is a photograph of cheese analogues of the invention.

Processed Cheese
  Ingredients
    25 g—Pea flour
    100 ml water
    1.5 NaCl [as a salt]
    20 g—butter & vegetable oil
    300 µl—cheddar cheese flavour (Universal flavour)
    200 µl—natural bacon flavour (Universal flavour)
Method Mix 25 grams of Pea flour with 100 ml of warm (60° C.) water. Add oil, butter and salt and pour the mixer into a commercial blender (Waring brand) and blend at high speed for three minutes. Add cheddar cheese flavour, and bacon flavour, and blend for one more minute. Cook the mixture in a microwave oven (stir mixture frequently) until it reaches 85° C. internal temperature. Let to set in the refrigerator over night before serving. A processed cheese of the invention is depicted in FIG. 11.

Example 9
Cioccolato Dessert

Figure 12:
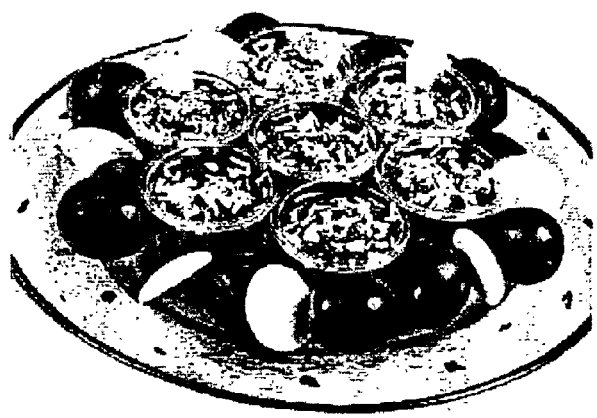
FIG. 12 is a photograph of a further dessert of the invention.

Ingredients
50 g—Pea flour
30 g—caster sugar
0.2 g—nutra sweet
200 ml—water
15 g—butter
20 g—vegetable oil
1.5 ml—Comax natural milk flavour
5 g—cocoa
3 g—$CaSO_4$ Method Mix 50 grams of Pea flour with 200 ml of water and heat in a microwave till 60° C. Add oil, cocoa, sugar, nutra sweet, and butter and pour the mixer into a commercial blender (Waring brand) and blend at high speed for two minutes. Add milk flavour, and continue blending for two more minutes. Cook the mixture in a microwave oven (stir mixture frequently) until it reaches 85° C. internal temperature. Add the $CaSO_4$ to the mixture and pour in moulds and let to set overnight in the refrigerator. Garnish with grated white chocolate or sliced almonds before serving. A Cioccolato dessert of the invention is depicted in FIG. 12.

Example 10
Pea Flour Gels Containing Glucagel and Locust Bean Gum

Introduction

Syneresis is the decrease in water holding capacity of a gel, with its concomitant loss of water, and often occurs during storage. As the gel is made, a 3 dimensional network is formed which traps water molecules. During storage, interaction between particles of the dispersed phase increases as they contract, squeezing out water molecules to give a more energetically favourable conformation. Controlling syneresis is a important cause of instability in food systems, and can be seen in foods as diverse as yoghurt, jellies, cream cheese and mustard.

Syneresis is commonly controlled by the addition of gums and starches (eg. guar gum, xanthan gum, pectin, carrageenan, gelatin, agar). Either a single additive, or a combination, can be extremely effective in controlling water loss.

The applicants determined the practicality of using a gum or Glucagel (beta-glucan from barley) in the pea flour-based gels of the invention to control syneresis. Glucagel and Locust Bean Gum (LBG) were compared as additives at various addition levels and monitored over time for water loss. Moreover, the mouthfeel and textural properties were evaluated.

Experimental Procedure:

(1) 25 g raw pea flour and 100 mL warm tap water were stirred together to remove any lumps, then heated in a microwave at 10% power to 60° C. with occasional stirring.
(2) The flour mixture was added to 20 mL canola oil in a Waring blender and mixed on high for 4 minutes, during which time the gelling agent was added.
(3) The mixture was heated to 85° C. in a microwave at 10% power with stirring every 5–10° C. temperature rise.
(4) 1.5 g calcium sulphate dispersed in 2 mL water was added and the mixture stirred thoroughly.
(5) The mixture was poured into two pre-weighed 75 mL sample containers with screw-top lids.
(6) Each sample was weighed that day to give an initial (day 0) weight, then stored in a refrigerator.
(7) On each of the four following days, then again on day eight, the gel was removed from the container. The inside of the container and lid was wiped out with a tissue. The gel surface was also blotted with a tissue to remove any surface water, before placing back into the container for weighing. Samples were placed back into the refrigerator for further storage.

Figure 13:
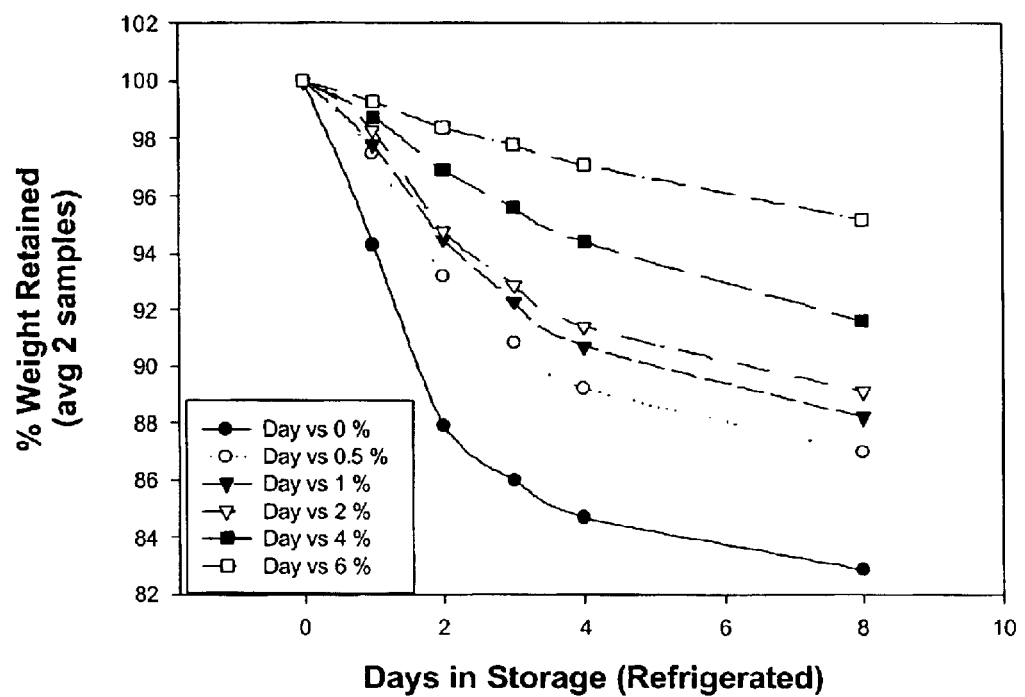
FIG. 13 is a graph showing Pea flour-based gel integrity during storage (Glucagel Addition)

Sample results for Glucagel are given in Table 3 below and shown in FIG. 13. Sample results for Locust Bean Gum are given in Table 4 below and shown in FIG. 14.

TABLE 3

| Sample ID | Glucagel added % | Glucagel added g | Container wt (empty, g) | Day 0 weight (g) | % weight kept day 0 | % weight lost day 0 |
|---|---|---|---|---|---|---|
| 1A | 0 | 0 | 18.4817 | 83.2349 | 100 | 0 |
| 1B | 0 | 0 | 18.5723 | 69.5845 | 100 | 0 |
| 2A | 2 | 3 | 18.5714 | 64.6149 | 100 | 0 |
| 2B | 2 | 3 | 18.4948 | 69.0655 | 100 | 0 |
| 3A | 4 | 6 | 18.5242 | 64.7985 | 100 | 0 |
| 3B | 4 | 6 | 18.5694 | 65.8922 | 100 | 0 |
| 4A | 6 | 9 | 18.4938 | 80.3391 | 100 | 0 |
| 4B | 6 | 9 | 18.4915 | 75.6139 | 100 | 0 |
| 5A | 0.5 | 0.75 | 18.4903 | 69.4850 | 100 | 0 |
| 5B | 0.5 | 0.75 | 18.4444 | 79.9004 | 100 | 0 |
| 6A | 1 | 1.5 | 18.5254 | 80.6655 | 100 | 0 |
| 6B | 1 | 1.5 | 18.4390 | 79.7206 | 100 | 0 |

| Day 1 weight (g) | % weight kept day 1 | % weight lost day 1 | Day 2 weight (g) | % weight kept day 2 | % weight lost day 2 |
|---|---|---|---|---|---|
| 78.8867 | 94.8 | 5.2 | 75.9632 | 88.8 | 11.2 |
| 65.3012 | 93.8 | 6.2 | 63.0023 | 87.1 | 12.9 |
| 63.4737 | 98.2 | 1.8 | 62.1965 | 94.7 | 5.3 |
| 67.9426 | 98.4 | 1.6 | 66.4723 | 94.9 | 5.1 |
| 64.0287 | 98.8 | 1.2 | 63.3150 | 96.8 | 3.2 |
| 65.1143 | 98.8 | 1.2 | 64.4805 | 97.0 | 3.0 |
| 79.7787 | 99.3 | 0.7 | 79.3250 | 98.4 | 1.6 |
| 75.0579 | 99.3 | 0.7 | 74.6975 | 98.4 | 1.6 |
| 67.6800 | 97.4 | 2.6 | 66.0234 | 93.2 | 6.8 |
| 77.9457 | 97.6 | 2.4 | 75.7731 | 93.3 | 6.7 |
| 78.8901 | 97.8 | 2.2 | 77.3260 | 94.6 | 5.4 |
| 77.9627 | 97.8 | 2.2 | 76.2355 | 94.3 | 5.7 |

| Day 3 weight (g) | % weight kept day 3 | % weight lost day 3 | Day 4 weight (g) | % weight kept day 4 | % weight lost day 4 |
|---|---|---|---|---|---|
| 74.5903 | 86.6 | 13.4 | 73.6880 | 85.3 | 14.7 |
| 62.0869 | 85.3 | 14.7 | 61.5086 | 84.2 | 15.8 |
| 61.3180 | 92.8 | 7.2 | 60.6577 | 91.4 | 8.6 |
| 65.4899 | 92.9 | 7.1 | 64.7379 | 91.4 | 8.6 |
| 62.6171 | 95.3 | 4.7 | 62.0301 | 94.0 | 6.0 |
| 63.9764 | 96.0 | 4.0 | 63.4261 | 94.8 | 5.2 |
| 78.9187 | 97.7 | 2.3 | 78.4948 | 97.0 | 3.0 |
| 74.3717 | 97.8 | 2.2 | 74.0287 | 97.2 | 2.8 |
| 64.8341 | 90.9 | 9.1 | 64.0295 | 89.3 | 10.7 |
| 74.2167 | 90.8 | 9.2 | 73.2368 | 89.2 | 10.8 |
| 76.0024 | 92.5 | 7.5 | 75.0207 | 90.9 | 9.1 |
| 74.9223 | 92.2 | 7.8 | 73.9188 | 90.5 | 9.5 |

| Day 8 weight (g) | % weight Kept day 8 | % weight lost day 8 |
|---|---|---|
| 72.3935 | 83.3 | 16.7 |
| 60.6402 | 82.5 | 17.5 |
| 59.5757 | 89.1 | 10.9 |
| 63.5940 | 89.2 | 10.8 |
| 60.7369 | 91.2 | 8.8 |
| 62.1371 | 92.1 | 7.9 |
| 77.3534 | 95.2 | 4.8 |
| 72.9158 | 95.3 | 4.7 |
| 62.8393 | 87.0 | 13.0 |

TABLE 3-continued

| | | |
|---|---|---|
| 71.8776 | 86.9 | 13.1 |
| 73.4498 | 88.4 | 11.6 |
| 72.4264 | 88.1 | 11.9 |

TABLE 4

| Sample ID | LBG % | added g | Container wt (empty, g) | Day 0 weight (g) | % weight kept day 0 | % weight lost day 0 |
|---|---|---|---|---|---|---|
| 1A | 0 | 0 | 18.4817 | 83.2349 | 100 | 0 |
| 1B | 0 | 0 | 18.5723 | 69.5845 | 100 | 0 |
| 7A | 0.25 | 0.375 | 18.5725 | 69.7977 | 100 | 0 |
| 7B | 0.25 | 0.375 | 18.5625 | 65.8148 | 100 | 0 |
| 8A | 0.5 | 0.75 | 18.5762 | 75.4021 | 100 | 0 |
| 8B | 0.5 | 0.75 | 18.4952 | 79.0698 | 100 | 0 |
| 9A | 1 | 1.5 | 18.5692 | 73.9754 | 100 | 0 |
| 9B | 1 | 1.5 | 18.4441 | 79.6928 | 100 | 0 |

| Day 1 Weight (g) | % weight kept day 1 | % weight lost day 1 | Day 2 weight (g) | % weight kept day 2 | % weight lost day 2 |
|---|---|---|---|---|---|
| 78.8867 | 94.8 | 5.2 | 75.9632 | 88.8 | 11.2 |
| 65.3012 | 93.8 | 6.2 | 63.0023 | 87.1 | 12.9 |
| 68.7635 | 98.5 | 1.5 | 68.1762 | 96.8 | 3.2 |
| 64.6855 | 98.3 | 1.7 | 63.8356 | 95.8 | 4.2 |
| 74.5276 | 98.8 | 1.2 | 73.9294 | 97.4 | 2.6 |
| 78.1104 | 98.8 | 1.2 | 77.4789 | 97.4 | 2.6 |
| 73.2900 | 99.1 | 0.9 | 73.0478 | 98.3 | 1.7 |
| 78.9661 | 99.1 | 0.9 | 78.6392 | 98.3 | 1.7 |

| Day 3 Weight (g) | % weight kept day 3 | % weight lost day 3 | Day 4 weight (g) | % weight kept day 4 | % weight lost day 4 |
|---|---|---|---|---|---|
| 74.5903 | 86.6 | 13.4 | 73.6880 | 85.3 | 14.7 |
| 62.0869 | 85.3 | 14.7 | 61.5086 | 84.2 | 15.8 |
| 67.6420 | 95.8 | 4.2 | 67.1473 | 94.8 | 5.2 |
| 63.3061 | 94.7 | 5.3 | 62.7645 | 93.5 | 6.5 |
| 73.4372 | 96.5 | 3.5 | 73.0249 | 95.8 | 4.2 |
| 76.9189 | 96.4 | 3.6 | 76.2570 | 95.4 | 4.6 |
| 72.7376 | 97.8 | 2.2 | 72.4603 | 97.3 | 2.7 |
| 78.3144 | 97.7 | 2.3 | 78.0677 | 97.3 | 2.7 |

| Day 8 Weight (g) | % weight Kept day 8 | % weight lost day 8 |
|---|---|---|
| 72.3935 | 83.3 | 16.7 |
| 60.6402 | 82.5 | 17.5 |
| 66.0503 | 92.7 | 7.3 |
| 61.6568 | 91.2 | 8.8 |
| 72.1344 | 94.2 | 5.8 |
| 75.2407 | 93.7 | 6.3 |
| 72.0412 | 96.5 | 3.5 |
| 77.6105 | 96.6 | 3.4 |

Experimental Observations:

In making the 2% and 4% glucagel samples, the glucagel was added to the blender as stated in step 2 of the method. The glucagel tended to lump rather than dispersing evenly, and thickened considerably at this stage. Because of the difficulty this caused in removing the sample from the blender, for the 6% sample the glucagel was added to the blended oil and flour solution between steps 2 and 3, and mixed in by hand. The tendency of the glucagel to thicken even though it was not evenly dispersed was again noted. In the 0.5% and 1% samples, glucagel was added after blending, as for the 6% sample. In all samples the lumps of glucagel in the product dispersed (with stirring) in the last stages of heating (80–85° C.).

Locust Bean Gum was added directly to the blender during step 2 of the method for all samples. The dispersion problems seen for glucagel were not observed.

From a comparison of the graphs, it seems that glucagel has a similar effect on syneresis as LBG, when added at 6–8 times the concentration. The physical properties of the gels made with the two different additives are quite different however. The gel made using LBG appears to maintain quite a soft texture, whereas glucagel causes the gel to become much firmer and more elastic.

Significant Observations:

LBG is useful for minimizing syneresis at least up to 1% addition levels. However, the LBG samples were softer than the control, and greasy to the touch. The mouthfeel is slimy.

Glucagel is also good at controlling syneresis, although more is required compared to LBG. And unexpected positive outcome was the effect of Glucagel on the textural properties of the gels. For example, the 1% glucagel sample was rubbery, and elastic or bouncier than the 1% LBG sample.

Glucagel solublizes better at elevated temperatures. (~70+° C.)

The 6% Glucagel sample was very firm and elastic. Most meaty and chewy.

Conclusion:

Both LBG and Glucagel improved the water holding stability of the gels. LBG was more effective in controlling syneresis but also imparted an undesirable, slimy mouthfeel.

In addition to controlling syneresis, Glucagel improved the viscoelastic texture of the Pea flour gels, which is important in applications such as meat and cheese analogues.

Comparative Example 1

A Functional Comparison Between Pea, Lentil and Soy Flours and Soy Concentrate and Soy Isolate.

Introduction:

Although many tofu and gel-Like products are soy-based, it was unclear whether soy would function as a gelling or structuring agent when used in the processes of the invention. To investigate their performance, full fat soy flour, and derivatives of soy (Soy protein isolate, soy protein concentrate, defatted soy) as well as Marrowfat (green pea) and lentil flour were substituted for yellow pea flour in the formulation set forth in Example 1. The effect of $Ca^{++}$ salts were also investigated, including addition of 0.1 to 3% calcium sulphate to pea flour.

Method

Commercially available soy protein isolate (Ardex-R, Archer Daniels Midland, USA), soy protein concentrate (Arcon-S, Archer Daniels Midland, USA), and full-fat (Global Pacific, Ltd, Australia) and defatted soy flour (Nutrasoy 7B, Archer Daniels Midland, USA) were used in this experiment. Marrowfat Pea (i.e. green pea, Midici var.) and field-run lentils were from New Zealand Plant Breeding, Ltd).

200 ml water was mixed with 50 g flour, concentrate or isolate. The mixture was heated to 60° C. in a domestic microwave at 50% power with frequent mixing. The heated mixture was then poured into a blender containing 35 ml canola oil and whizzed on high for 4 minutes. The mixture was then returned to the microwave (50% power) and heated to 90° C. with frequent mixing. Half of the mixture was poured into moulds and let to set. Calcium Chloride (0.5 g) was added to the remaining mixture (heated to 90° C.) and mixed uniformly throughout the liquid. It was then immediately poured into cylindrical moulds. These were allowed to stand at room temperature for 30 minutes and then placed in a refrigerator overnight.

Ardex pH adjustment: Ardex is a low pH product. We made one set of samples without adjusting pH and another set according to the following procedure. 140 ml water was mixed with 50 g Ardex. The pH was measured (4.8) and 60 ml of NaOH (0.5M) added gradually with continuous stirring. The final pH of the mix was 7. This was then processed as described above.

Results and Discussion:

Full Fat and Defatted Soy Flour

Figure 17:
FIG. 17 is a photograph of a cheese analogue prepared according to the procedure described for example 1 but substituted with full-fat soy flour in place of pea flour in a 1:1 proportion and without any added calcium salt.
Figure 18:
FIG. 18 is a photograph of a cheese analogue prepared according to the procedure described for example 1 but substituted with full-fat soy flour in place of pea flour in a 1:1 proportion. This sample contains the normal amount of added calcium salt.

Full fat soy did not form a gel (FIGS. 17 and 18). It was more like a viscous paste in appearance. A uniform emulsion formed during the blending stage, however, it tended to separate into an oily phase and a pasty curd upon addition of calcium salt. It appears that soy protein has such a high affinity for calcium that it combines into a complex that separates from the oil/water interface, thus breaking the emulsion.

Figure 19:
FIG. 19 is a photograph of a cheese analogue prepared according to the procedure described for example 1 but substituted with defatted soy flour in place of pea flour in a 1:1 proportion and without any added calcium salt.
Figure 20:
FIG. 20 is a photograph of a cheese analogue prepared according to the procedure described for example 1 but substituted with defatted soy flour in place of pea flour in a 1:1 proportion. This sample contains the normal amount of added calcium salt.

Similar results were obtained using defatted soy flour (FIGS. 19 and 20). The samples sagged under their own weight. However the defatted soy flour samples with added $Ca^{++}$ formed a very soft, mushy curd, retaining part of its structure after it was removed from the cylindrical mould. This also indicates that the addition of $Ca^{++}$ salts to full fat soy does not stabilize the gels as in yellow pea gels.

Soy Protein Isolate—Ardex-R

Figure 21:
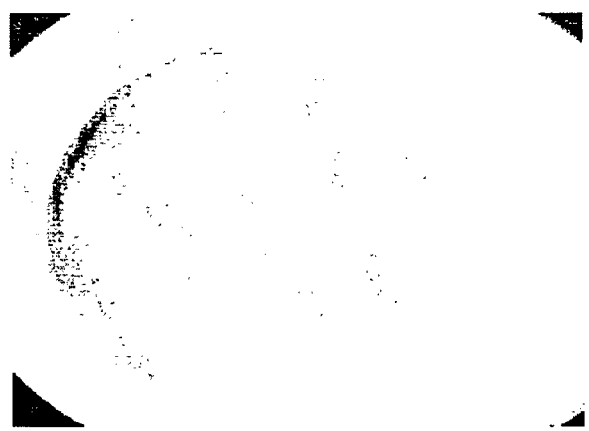
FIG. 21 is a photograph of a cheese analogue prepared according to the procedure described for example 1 but substituted with soy protein isolate at pH 4.8 in place of pea flour in a 1:1 proportion and without any added calcium salt.
Figure 22:
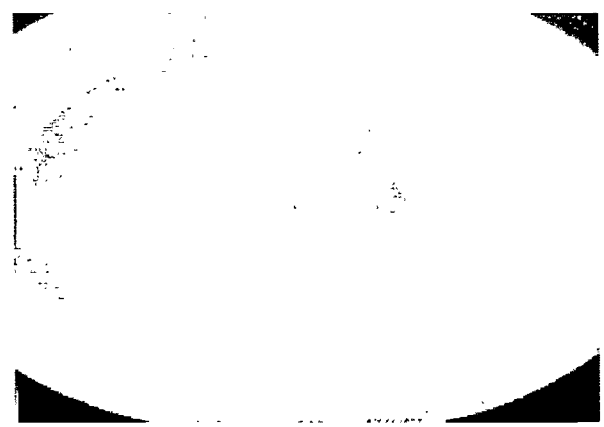
FIG. 22 is a photograph of a cheese analogue prepared according to the procedure described for example 1 but substituted with soy protein isolate, at pH 4.8 in place of pea flour in a 1:1 proportion. This sample contains the normal amount of added calcium salt.

Soy isolates can be either low pH precipitates or neutral pH "proteinates". The properties of both forms were investigated. The low pH (4.8) isolate did not display any gelling or other functional properties. It formed a runny liquid regardless of the presence or absence of calcium (FIGS. 21 and 22). It is also likely that the proteins are not very functional because they are near their isoelectric point of lowest solubility when at this pH.

Figure 23:
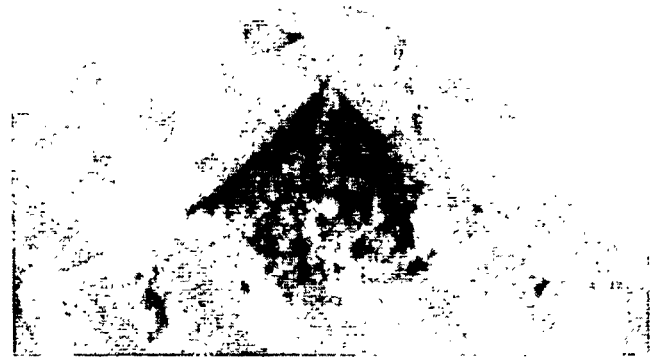
FIG. 23 is a photograph of a cheese analogue prepared according to the procedure described for example 1 but substituted with soy protein isolate at pH 7 in place of pea flour in a 1:1 proportion and without any added calcium salt.
Figure 24:
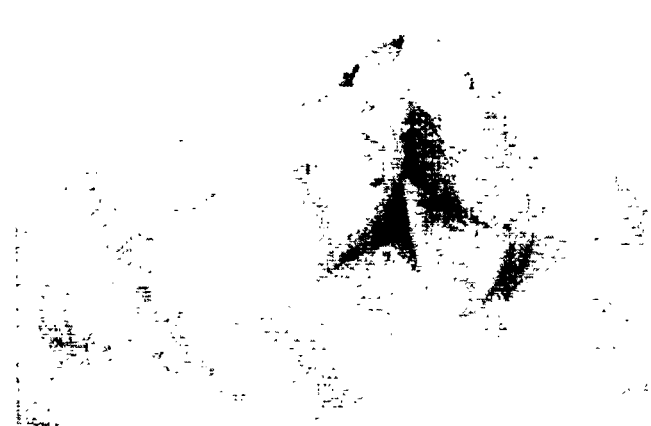
FIG. 24 is a photograph of a cheese analogue prepared according to the procedure described for example 1 but substituted with soy protein isolate, at pH 7 in place of pea flour in a 1:1 proportion. This sample contains the normal amount of added calcium salt.

FIGS. 23 and 24 show that the soy protein isolate, adjusted to pH 7, did form some structure (with or without added $Ca^{++}$) but was very pasty and inelastic. It was easily deformed under compression as indicated by the "memory" of the knife impression at the top of each sample.

Soy Concentrate—Arcon-S

Figure 25:
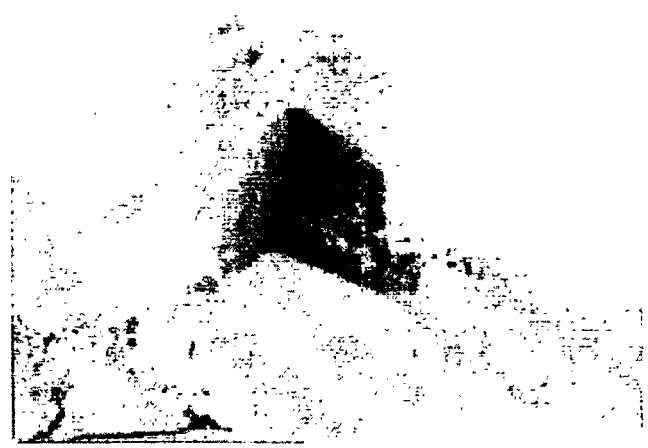
FIG. 25 is a photograph of a cheese analogue prepared according to the procedure described for example 1 but substituted with soy protein concentrate in place of pea flour in a 1:1 proportion and without any added calcium salt.
Figure 26:
FIG. 26 is a photograph of a cheese analogue prepared according to the procedure described for example 1 but substituted with soy protein concentrate in place of pea flour in a 1:1 proportion. This sample contains the normal amount of added calcium salt.
Figure 27:
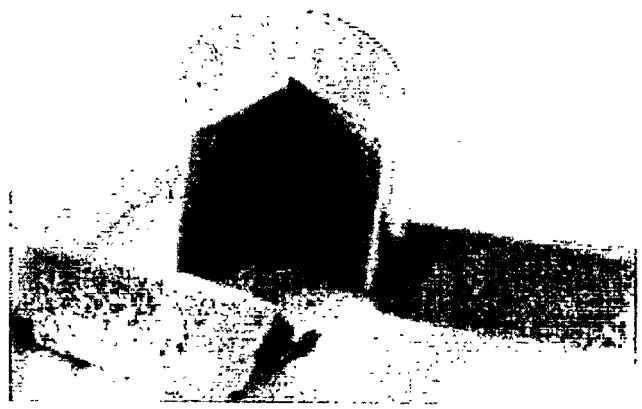
FIG. 27 is a photograph of a cheese analogue prepared according to the procedure described for example 1 but substituted with lentil flour in place of pea flour in a 1:1 proportion and without any added calcium salt.
Figure 28:
FIG. 28 is a photograph of a cheese analogue prepared according to the procedure described for example 1 but substituted with lentil flour in place of pea flour in a 1:1 proportion. This sample contains the normal amount of added calcium salt.
Figure 29:
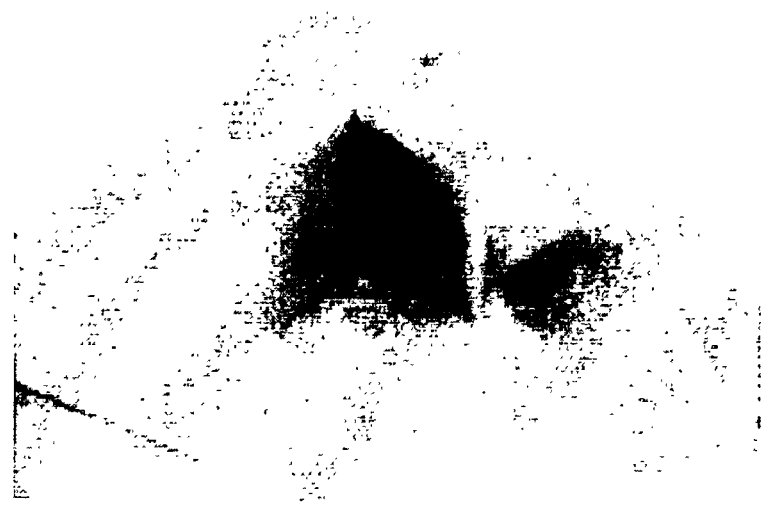
FIG. 29 is a photograph of a cheese analogue prepared according to the procedure described for example 1 but substituted with marrowfat pea flour in place of pea flour in a 1:1 proportion and without any added calcium salt.
Figure 30:
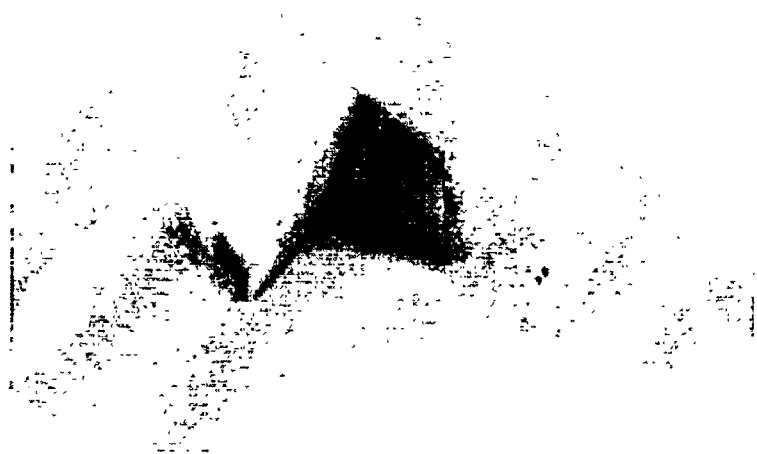
FIG. 30 is a photograph of a cheese analogue prepared according to the procedure described for example 1 but substituted with marrowfat pea flour in place of pea flour in a 1:1 proportion. This sample contains the normal amount of added calcium salt.

Although some stucture of the mould was retained, the sample without calcium (FIG. 25) and upon compression no recovery was observed. The structure was very crumbly and pasty and it could not be cut into clean segments (failure in stucture while cutting). The addition of $Ca^{++}$ salts increased firmness somewhat, as shown in FIG. 26, but the sample was not uniform and exhibited large inclusions of indeterminate composition. Overall the concentrates were crumbly to mushy with no apparent elasticity.

Marrowfat Pea and Lentil Flour

In comparison to the gels made with yellow or white or field pea, Marrowfat pea flour and typical field-run commercial lentil flour form similar gels (FIGS. 27 through 30). They are as firm as yellow pea gels and exhibit similar elastic textural properties. They can be cut into clean segments or slices without any failure in the structure. A certain amount of syneresis and shrinkage is observed in these gels after over night storage (6° C.). This phenomena is typical of food gels and may be caused by contraction of the gel matrix as polypeptide and/or polysaccharide chains interact strongly with each other over time and thereby squeezing water out of the system. These gels are virtually identical to yellow pea gels in terms of their viscoelastic properties.

Summary and Conclusions:

The viscoelastic properties of the soy samples were not determined because for the most part, the soy samples were too soft and pasty to permit placement into the Instron sample chamber. A simple qualitative test was performed by gently pressing the side of a knife against the top of each sample. The result of this test appears as a "Vee"-shaped impression in the images of the semi-solid soy samples, thus demonstrating the absence of elasticity.

In all cases, the soy-based samples were not true gels in the sense that they did not exhibit the syneresis, elasticity or hardness properties associated with the pea-based gels as described in the specification. Moreover, the reaction with calcium suggests that the interaction differs from that of pea flour. This interaction seems to be weaker when the protein is from pea (or lentil) and thus, contributes to the formation of a matrix that enhances the gel structure.

Figure 4:
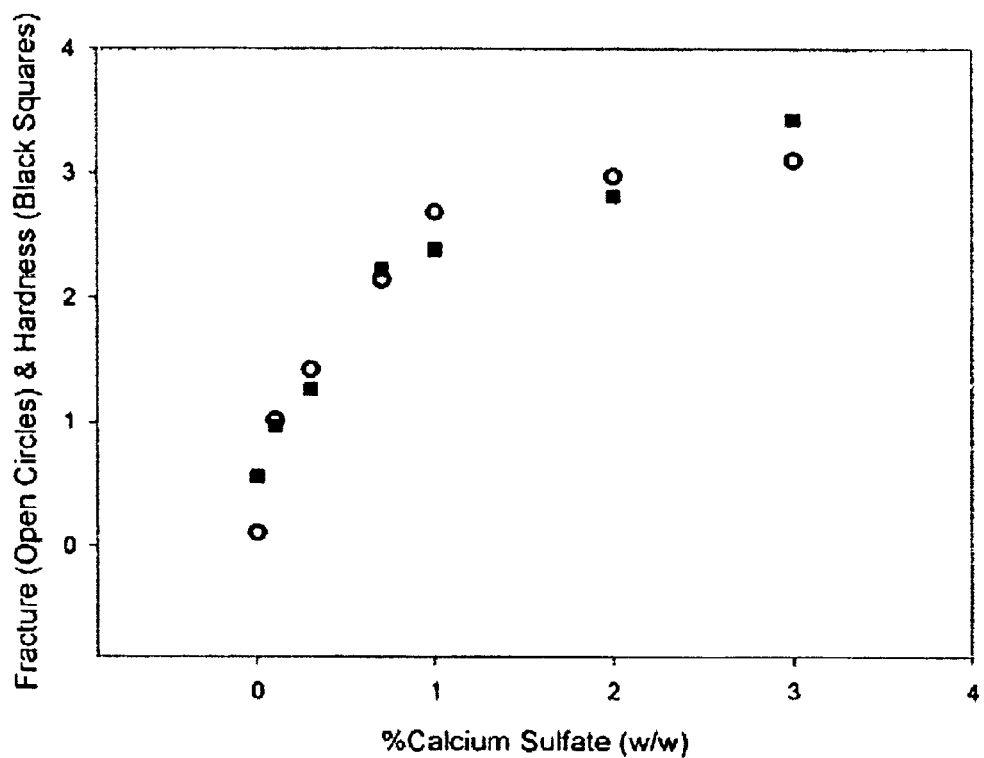
FIG. 4 is a graph showing the effect of calcium sulfate on Instron data.

Pea flour gels, prepared without any added calcium, were not as firm or elastic as those with calcium. This was expected as shown in FIG. 4 of the specification. However, the overall texture of all pea-based samples was consistently elastic. Moreover, the there was no appreciable release of lipid among any of the pea-based samples, indicating that a stable emulsion was formed in both the presence and absence of calcium.

INDUSTRIAL APPLICATION

The present invention provides food products derived from pea or lentil flour, and which are suitable for a variety of applications as structured foods, as described above. The food products of the invention have the advantages that they are nutritious, have good colour, are cost effective to produce being derived from pea or lentil flour, and, unlike soya flour, derived from plants which to date are only cultivated using seed produced by traditional breeding methods and are thus not currently genetically engineered.

The products of the invention have further advantages in that they are homogenous and stable, exhibit good water holding properties, and require minimal processing. This minimal processing is an advantage for manufacturers as well as being required to retain the unique gelling properties identified for the pea and lentil flour based products.

The products of the invention also have applications as gelling agents and are useful for medical or pharmaceutical applications.

While the invention has been described with reference to particular embodiments, it will be appreciated by those persons skilled in the art that numerous variations and modifications may be made without departing from the scope of the invention.

What is claimed is:

1. A gelled food product comprising a stable gel matrix capable of holding bulk liquid formed from a starch and protein containing pea or lentil flour, wherein the flour starch has been gelatinised and the flour protein has been at least partially denatured and coagulated, and an added coagulating agent, wherein the coagulating agent is a di- or multivalent cation or salt thereof added in an amount of from about 0.06% by weight of the product; and with the proviso that the product does not include a hydrolysing enzyme.

2. A product according to claim 1 wherein the coagulating agent is added in an amount of from about 0.06% to 3.00%.

3. A product according to claim 1 wherein the coagulating agent is a metal cation.

4. A product according to claim 3 wherein the motel cation is magnesium or calcium.

5. A product according to claim 1 wherein the coagulating agent is a di- or multivalent metal salt.

6. A product according to claim 5 wherein the metal salt is a magnesium or calcium salt.

7. A product according to claim 6 wherein the magnesium or calcium salt is selected from $MgCl_2$, $CaCl_2$, $MgSO_4$, and $CaSO_4$.

8. A product according to claim 7 wherein the salt is $CaSO_4$.

9. A product according to claim 1, wherein the flour is selected from yellow, white or field pea flour, and lentil flour or mixtures thereof.

10. A product according to claim 8 wherein the flour is yellow pea flour.

11. A product according to claim 1 which further comprises a source of lipid.

12. A product according to claim 11 wherein the lipid is selected from vegetable oil, butter or a mixture thereof.

13. A product according to claim 1 which further comprises a liquid, and wherein the flour to liquid ratio is from 1:20 to 1:2 w/w.

14. A product according to claim 1 which further comprises one or more additives selected from flavouring agents, binding agents, sweeteners, emulsifiers, antioxidants, vitamins, minerals, enzymes, salts, stabilisers, proteins, colouring agents, flour agents, wetting agents, humectants, thickeners, preservatives, acidifiers, herbs, spices, hormones, oligosaccharides, lipids, or microorganisms.

15. A product according to claim 1 which comprises one or more oligosaccharides, one or more phytoestrogens, calcium and optionally vitamin D and/or a starter culture.

16. A process of preparing a gelled food product comprising a stable gel matrix capable of holding bulk water, the process comprising:

forming a mixture of a liquid, an added coagulating agent and a starch and protein containing pea or lentil flour, wherein the flour starch is gelatinised and the protein flour is at least partially denatured and coagulated, wherein the coagulating agent is a di- or multivalent cation or a salt thereof and is added in an amount of from about 0.06% by weight of the product; with the proviso that no hydrolysing enzyme is used in the process.

17. A process according to claim 16 wherein the coagulating agent is added in an amount of from about 0.06% to 3.00%.

18. A process according to claim 16 wherein the coagulating agent is a metal cation.

19. A process according to claim 18 wherein the metal cation is magnesium or calcium.

20. A process a cording to claim 16 wherein the coagulating agent is a divalent or multivalent metal salt.

21. A process according to claim 20 wherein the metal salt is a calcium or magnesium salt.

22. A process according to claim 21 wherein the metal salt is selected from $CaCl_2$, $MgCl_2$, $CaSO_4$ and $MgSO_4$.

23. A process according to claim 22 wherein the salt is $CaSO_4$.

24. A process according to claim 16 wherein the flour to liquid ratio is from 1:20 to 1:2 w/w.

25. A process according to claim 16 wherein the flour and liquid are mixed together under conditions of shear and temperature sufficient to hydrate the flour and initiate gelatinisation of the flour starch.

26. A process according to claim 25 wherein moderate shear is used and the temperature is about 55° C. to 65° C.

27. A process according to claim 26 wherein the temperature is about 60° C.

28. A process according to claim 16 wherein a source of lipid is combined with the mixture under conditions of shear and temperature sufficient to form an emulsion.

29. A process according to claim 16 wherein the mixture is heated to a sufficient temperature and for a sufficient time to substantially fully effect starch gelatinisation and denaturation and coagulation of the flour protein.

30. A process according to claim 29 wherein the mixture is heated to a temperature of at least about 73° C.

31. A process according to claim 30 wherein the mixture is heated to a temperature of about 85 to 90° C.

32. A process according to claim 16 wherein the flour is yellow, white, field or marrow pea flour or a mixture thereof.

33. A process according to claim 32 wherein the flour is yellow pea flour.

34. A process according to claim 32 wherein the flour has been debittered prior to use.

35. A process for producing a gelled food product comprising a stable gel matrix capable of holding bulk water, the process comprising:

extruding a mixture of a starch and protein containing pea or lentil flour, an added coagulating agent, and liquid under conditions of temperature and shear sufficient to gelatinise the flour starch and at least partially denature and coagulate the flour proteins, wherein the coagulating agent is a di- or multivalent cation or a salt thereof and is added in an amount of from about 0.06% by weight of the product; with the proviso that no hydrolysing enzyme is used in the process.

36. A process according to claim 35 wherein the coagulating agent is added in an amount of from about 0.06% to 3.00%.

37. A process according to claim 35 wherein the coagulating agent is a metal cation.

38. A process according to claim 37 wherein the metal cation is magnesium or calcium.

39. A process according to claim 35 wherein the coagulating agent is a di-valent or multi-valent metal salt.

40. A process according to claim 39 wherein the metal salt is a calcium or magnesium salt.

41. A process according to claim 40 wherein the salt as selected from $CaCl_2$, $MgCl_2$, $CaSO_4$ $CaSO_4$ and $MgSO_4$.

42. A process according to claim 41 wherein the salt is $CaSO_4$.

43. A process according to claim 35 wherein the mixture further includes a source of lipid.

44. A process according to claim 43 wherein the flour, liquid and coagulating agent are mixed together before the source of lipid is added.

45. A process according to claim 34 wherein the flour to liquid ratio is from 1:20 to 1:2 w/w.

46. A process according to claim 34 wherein the extrusion is carried out at a temperature of about 73 to 180° C.

47. A process according to claim 46 wherein the process is carried out at a temperature of about 80 to 100° C.

48. A process according to claim 34 wherein the flour is yellow, white, field or marrow pea flour of a mixture thereof.

49. A process according to claim 48 wherein the flour is yellow pea flour.

50. A process according to claim 16 wherein the liquid is water.

51. A food product obtainable by a process as claimed in claim 16.

52. A food product when obtained by a process as claimed in claim 16.

* * * * *